United States Patent [19]

Hoogenboom

[11] Patent Number: 4,719,341

[45] Date of Patent: Jan. 12, 1988

[54] FIBER OPTIC DISPLACEMENT SENSOR WITH OSCILLATING OPTICAL PATH LENGTH

[75] Inventor: Leo Hoogenboom, Ballston Lake, N.Y.

[73] Assignee: Mechanical Technology Incorporated, Latham, N.Y.

[21] Appl. No.: 914,138

[22] Filed: Oct. 1, 1986

[51] Int. Cl.[4] .................................................. G01J 1/20
[52] U.S. Cl. ...................................... 250/201; 250/227
[58] Field of Search .................. 250/201 DF, 201 PF, 250/201 AF, 227, 201 R; 369/44, 45, 46; 354/403, 404, 405, 406, 407; 356/4, 5

[56] References Cited

U.S. PATENT DOCUMENTS

| | | | |
|---|---|---|---|
| 4,070,116 | 1/1978 | Frosch et al. | 250/201 R |
| 4,118,736 | 10/1978 | Okada et al. | 250/201 DF |
| 4,310,911 | 1/1982 | Fujishima | 250/201 DF |
| 4,342,919 | 8/1982 | Brogardh | 250/227 |
| 4,439,848 | 3/1984 | Cheshkovsky et al. | 250/201 DF |

*Primary Examiner*—David C. Nelms
*Assistant Examiner*—William L. Oen
*Attorney, Agent, or Firm*—Joseph V. Claeys; Joseph C. Sullivan

[57] ABSTRACT

A proximity sensor includes a bifurcated optic fiber bundle with a face and a projection lens for projecting an image on a target and a feedback control loop for maintaining said face at a preselected distance from the target for tracking. An oscillating device is provided which is disposed in the light path with fixed excursion between the face and the target and which generates an AC component in said sensor signal that is proportional to the deviation of the actual distance from the preselected distance, whereby the error signal is kept near zero.

10 Claims, 10 Drawing Figures

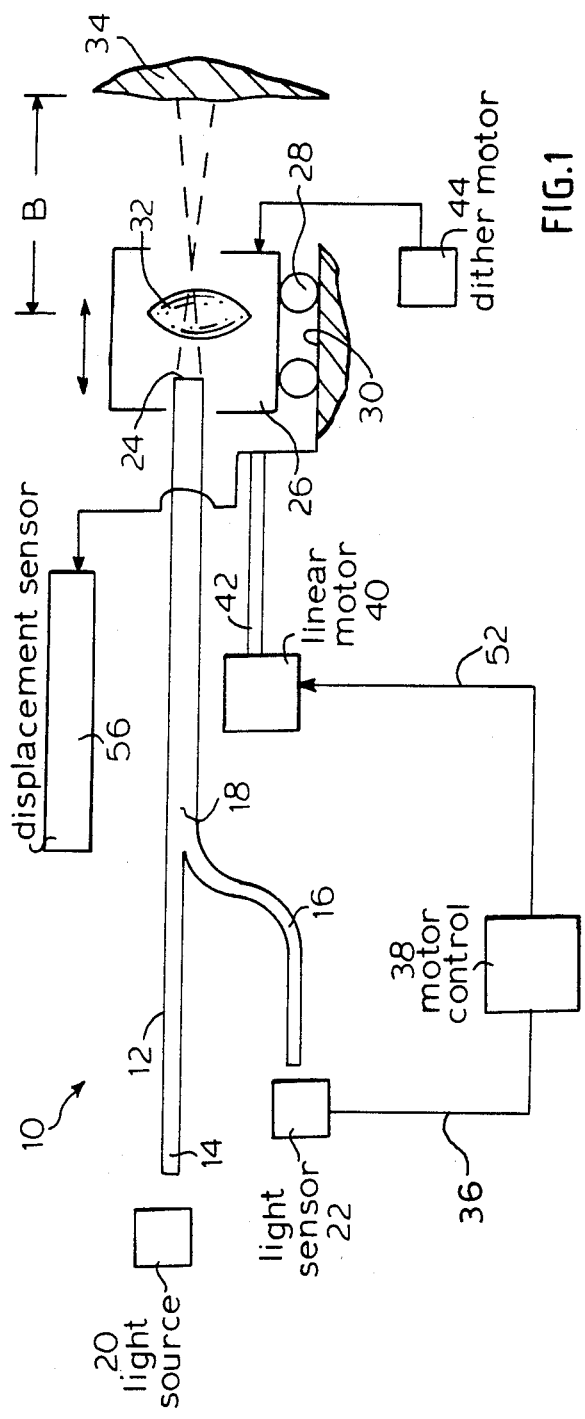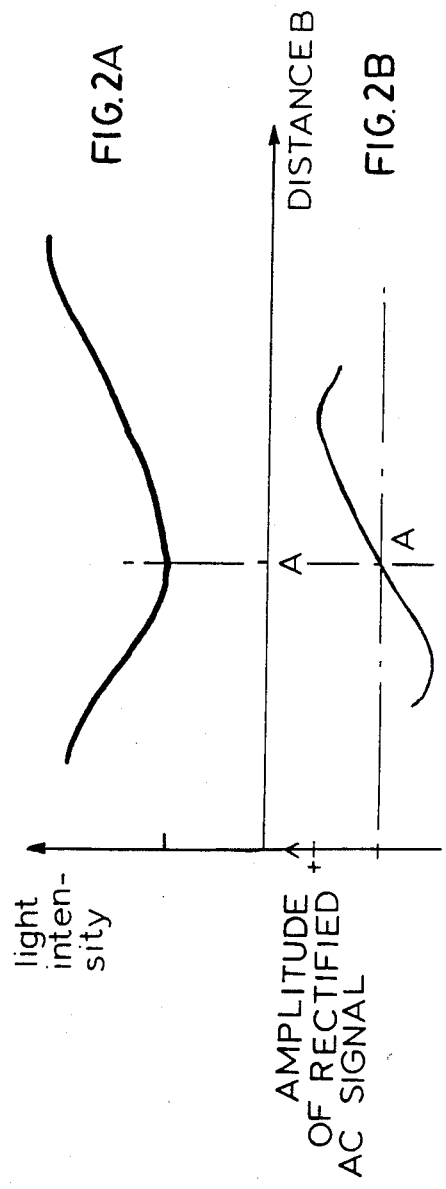

FIBER OPTIC DISPLACEMENT SENSOR WITH OSCILLATING OPTICAL PATH LENGTH

This application is related to U.S. application Ser. Nos. 823,599 and 823,600, both of which were filed on Jan. 29, 1986 and have the same inventor and assignee as the present invention.

BACKGROUND OF THE INVENTION a. Field of Invention

This invention relates to an optical proximity sensor with reciprocating means for oscillating the length of the optical path between a light source, a target and a light sensor.

b. Description of the Prior Art

Bifurcated optical fibers are frequently used in sensors to detect a distance to a target. Typically, one sensor bundle comprises two sets of fibers, each set originating from a respective arm, the two sets being joined in a common leg. Light is transmitted from a light source through one arm to the target and the corresponding light reflected from the target is conducted by the other arm to a light sensor. The intensity of the reflected light is indicative of the distance between the end of the common leg to the target. However, a direct measurement of the intensity has proven to be in unreliable parameter because of long and short term variations in the intensity of the light source, and variations in the reflectivity of the target. Numerous schemes have been devised in the past to overcome these problems. However, these schemes proved to be unreliable and/or very expensive to implement.

There is a present need for an optical sensor capable of indicating a distance to a target which yields reliable, consistent and accurate results and is inexpensive to make.

SUMMARY OF THE INVENTION

In accordance with the present invention, an optical proximity sensor comprises an optical component movably disposed with respect to a target or a bifurcate optical fiber bundle or to both. The bifurcate optical fiber bundle is arranged to direct light from a source to the target through an imaging lens system and to detect the corresponding reflected light from the target. Means are provided to oscillate the length of the optical path between the fiber bundle and the target whereby the light detected by the fiber includes an AC error signal proportional to the distance of the system from the focused condition. This AC component is used to track the target by maintaining the bundle at the focal point of the imaging lens system. By measuring the tracking motion the target motion or target profile can be obtained.

BRIEF DESCRIPTION OF THE FIGURES

FIG. 1 shows a photosensor in which an optical fiber bundle with imaging lens system is vibrated to vary the optical path length (B);

FIG. 2A shows the relationship between the light intensity sensed by the bundle of FIG. 1 and its distance (B) to the target without the vibrating motion;

FIG. 2B shows the relationship between the amplitude of the rectified AC signal and the distance the sensor is from focus.

DETAILED DESCRIPTION OF THE INVENTION

Figure 3:
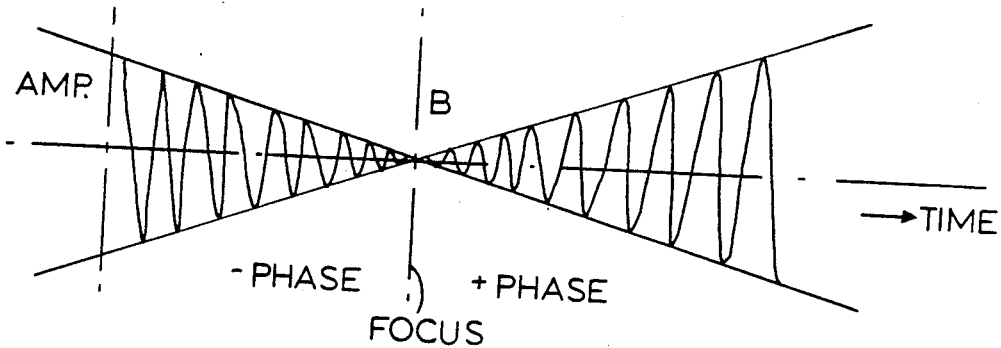
FIG. 3 shows the AC component of the signal from the bundle when the optical path length is oscillated, and when the probe with imaging lens system is moved through focus.

A sensor 10 is shown in FIG. 1, comprising a bifurcated optical fiber bundle 12. Bundle 12 has a first arm 14 and a second arm 16 having fibers which are joined together in a common leg 18. A light source 20 supplies light to arm 12 and a light sensor is provided for receiving light from arm 16. Leg 18 terminates in a face 24. At least a portion of leg 18 rests on a carriage 26 which is movable on rollers 28 with respect to a fixed support surface 30. Carriage 26 also supports a projection lens 32 provided to image face 24 on target 34. Furthermore, lens 32 also projects the image formed on the target back to face 24. The fibers from the two arms 14, 16 are intermixed within the leg 18 so that the light returned to face 24 from the target is transmitted by the fibers of arm 16 to light sensor 22.

As shown in FIG. 2A, the light intensity sensed by sensor 22 is dependent on the distance between carriage 26 and target 34. When this distance is equal to A, which is the distance at which the image of face 24 is focused on the target 34 by lens 32, this light intensity is at a minimum and it increases as the distance is increased or decreased.

The minimum at A is very sharp, but the signal as shown is not suitable to use directly in a servo that keeps distance A at a precisely fixed value. The feedback signal needed must change rapidly when the sensor passes through focus. Such a signal is obtained for example when dithering the sensor with a fixed amplitude. The amplitude of the resulting AC output is proportional to the distance that the sensor is from focus, as shown in FIG. 2B and FIG. 3.

The signal shown in FIG. 2B is obtained by passing the AC (error) signal shown in FIG. 3 through a phase sensitive rectifier. The phase reversal that occurs when passing through focus causes the rectified signal to pass through zero and change sign. The AC output 36 of sensor 22 is sent to motor control circuit 38 which controls a motor 40. Motor 40 could be a linear motor or other similar means for shifting carriage 26 with respect to support surface 30. Motor 40 controls the position of carriage 26 through a linkage 42.

In FIG. 1, the optical path length is oscillated by a dither motor 44 which forces carriage 26 to move toward and away from the target in a reciprocating motion. The function of the dither drive motor 44 is to cause an error signal that after rectification passes rapidly through zero at point A in FIG. 2. This error signal is shown in FIG. 3, and the amplitude of this AC component is proportional to the actual distance of the carriage from the focal point A mentioned above. When the carriage 26 passes this point, the AC component shows a phase reversal at point B in FIG. 3, at which point the rectified signal passes through zero.

Figure 4:
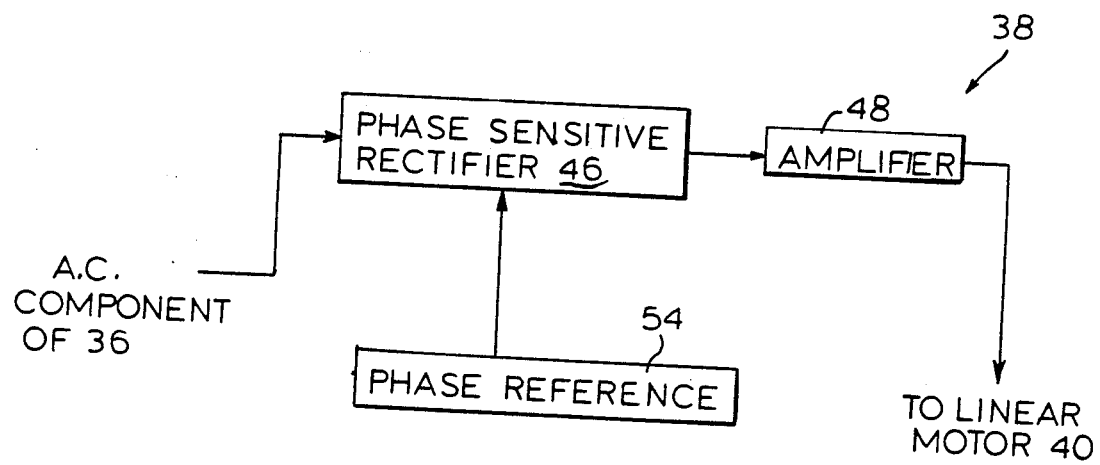
FIG. 4 shows partial details of the motor control for the sensor of FIG. 1.

As shown in FIG. 4, in the motor control circuit 38, the AC component of the signal from sensor 22 is fed to a phase sensitive rectifier 46 which produces an output as shown in FIG. 2B. The rectified signal is fed to an amplifier 48 and from there to motor 40 to control the position of carriage 26. When the target is in focus the error voltage is zero and motor 40 is at rest. When the target is out of focus the motor 40 receives a signal and moves until focus is obtained.

Thus, a feedback control circuit is formed by the carriage 26, optical bundle 12, light sensor 22, and control circuit 38 which tends to keep the carriage at focal point A thereby tracking target 34. A displacement sensor is coupled to the carriage for monitoring and displaying the carriage position with respect to mechanical ground.

The system described thus far is the subject matter of a commonly assigned co-pending application Ser. No. 709,563 filed Mar. 1, 1985 by Richard Dorman and Gregory Hull-Allen and entitled "Improved Fiber Optic Sensor Probe". The present invention discloses several alternatives to the system of FIG. 1 for changing the length of the light path between the bundle and the target.

Figure 5:
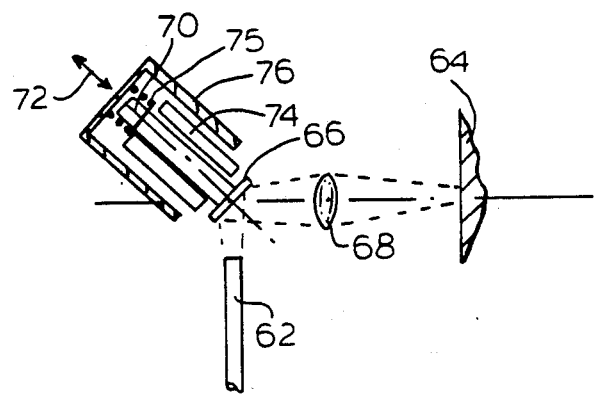
FIG. 5 shows a first means of oscillating the optical path without vibrating the fiber bundle with imaging lens system.

In FIG. 5, fiber optic bundle 62 is directed generally in parallel to the surface of target 64. Light from the bundle is directed towards a mirror 66 which reflects it towards the target surface 64 through projection lens 68. Mirror 66 is mounted on a support 70 adapted to oscillate the mirror along axis 72 by means well known in the art. For example, support 70 may be magnetic, and electromagnetic coil 74, pole piece 76 and spring 75 may be arranged to allow vibration of the mirror along axis 72, thereby varying the length of the optical path between the bundle 62 and target surface 64.

Figure 6:
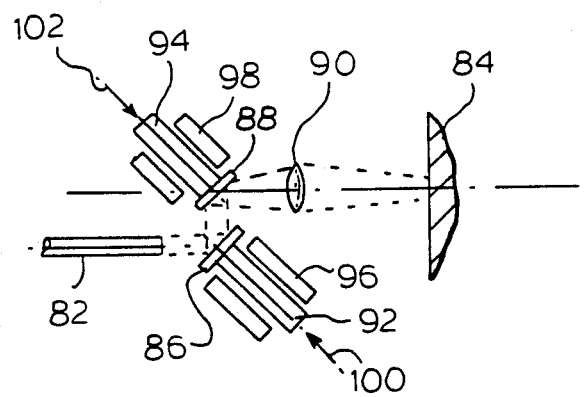
FIG. 6 shows a second means of oscillating the optical path without vibrating the fiber bundle with imaging lens system.

In the second embodiment illustrated in FIG. 6, the bundle 80 is oriented so that it directs light perpendicularly towards surface 84. The light from (and to) the bundle is reflected by mirrors 86, 88 towards imaging lens 90. Each mirror has a support 92, 94, and means such as coils 96 and 98 for vibrating the supports in phase opposition along axes 100, 102, as shown. Generally, axes 100, 102 lie at an angle of about 45° with respect to bundle 82.

Figure 7:
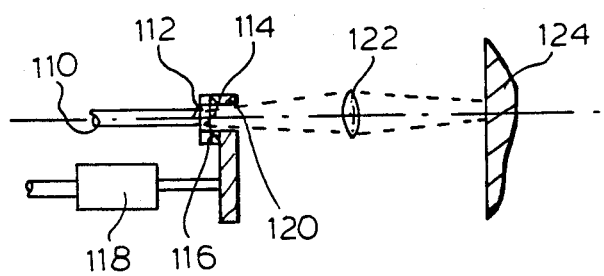
FIG. 7 shows a third means of oscillating the optical path without vibrating the fiber bundle with imaging lens system.

In the third embodiment illustrated in FIG. 7, bundle 110 has a front face 112 which is contacting a flexible lens or membrane 114. Flexible lens 114 changes its optical characteristics when stressed axially by a circular collar 116. For example, the lens may bulge outward along its optical axis when an axial force is applied to it. Alternatively, the lens may change its index of refraction in response to the axial force. A suitable lens which changes its curvature may be made, for example, of clear silicone rubber. A suitable lens which changes its index of refraction may be made of an elastomeric birefringent material. A device 118 is coupled to the collar 116 by a linkage 120 which cooperates to generate and transmit an oscillating axial force to the lens, thereby changing its optical characteristics in a reciprocating manner. Light from the bundle passes through flexible lens 114, and imaging lens 122 before striking target surface 124 and its path is effectively changed by the variations of the characteristics of the flexible lens 114.

Figure 8:
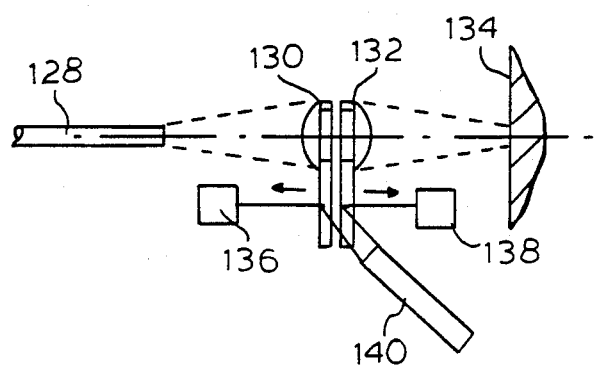
FIG. 8 shows a fourth means of oscillating the optical path without vibrating the fiber bundle, but with the lens imaging system components vibrating in phase oposition.
Figure 9:
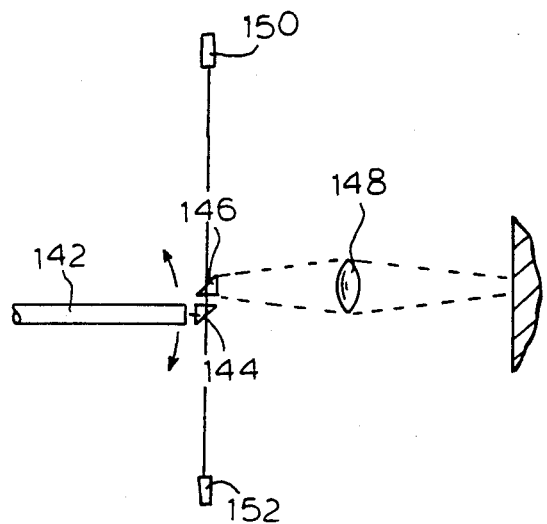
FIG. 9 shows a fifth means of oscillating the optical path without vibrating the lens imaging system but with the fiber bundle with prism vibrating laterally.

In the fourth embodiment in FIG. 8 the light from bundle 128 passes through a lens pair 130, 132 before striking target surface 134. The lenses are coupled to motors 136, 138 respectively which reciprocate the lenses synchronously along an axis parallel to bundle 128. The lenses must vibrate out of phase so that they simultaneously move either away from or toward each other. The motors 136, 138 are synchronized by control circuit 140. Alternatively, one of the lenses (for example lens 130) could be held stationary while the other lens 132 is reciprocated.

In the fifth embodiment, light from bundle 142 passes through two right prisms 144, 146. The two prisms reflect the light toward lens 148 as shown and are vibrated (individually (one only) or as a pair in phase opposition) in a direction perpendicular to the bundle 142 by corresponding vibrating devices 150, 152.

Thus, it can be seen that in the embodiments of FIGS. 5-9, to generate the error signal, the path travelled by light from the bundle face to the target and back is varied without requiring axial vibration of the bundle and lens assembly as a whole. As a result the unbalanced vibrating (dither caused) inertia force present in the system shown in FIG. 1 is much reduced or eliminated by the present invention.

Obviously numerous other modifications may be made to the invention without departing from its scope as referred to in the appended claims.

What is claimed is:
1. A proximity sensor for determining the distance to a target comprising:
 a light source;
 a bifurcated bundle of optical fibers with a first arm arranged to receive light from said light source, a second arm, and a common leg terminating in a bundle face:
 an imaging lens disposed in a light path between said bundle face and said target for generating a first image of said face on a surface of said target, and for generating a second image of the target on said face, the fibers of said bundle being arranged and constructed to conduct light received from the target through said second arm, the light received through said second arm having a minimal intensity when said face is at a predetermined position from said target;
 a light sensor coupled to said second arm for generating a sensor signal corresponding to the received light;
 a control circuit for generating a control signal corresponding to said sensor signal;
 oscillating means for oscillating a length of the light path between said bundle face and said target without moving said bundle face and imaging lens, and for generating an AC component in said sensor signal, said AC component being indicative of an instantaneous distance between said face and said predetermined position; and
 wherein said leg is disposed generally in parallel with said target surface, the proximity sensor comprises a mirror disposed in the light path between the bundle face and the target and said oscillating means comprises an oscillating linear motor which reciprocates the mirror along a preselected axis for changing the length of the path.

2. A proximity sensor for determining the distance to a target comprising:
- a light source;
- a bifurcated bundle of optical fibers with a first arm arranged to receive light from said light source, a second arm, and a common leg terminating in a bundle face:
- an imaging lens disposed in a light path between said bundle face and said target for generating a first image of said face on a surface of said target, and for generating a second image of the target on said face, the fibers of said bundle being arranged and constructed to conduct light received from the target through said second arm, the light received through said second arm having a minimal intensity when said face is at a predetermined position from said target;
- a light sensor coupled to said second arm for generating a sensor signal corresponding to the received light;
- a control circuit for generating a control signal corresponding to said sensor signal;
- oscillating means for oscillating a length of the light path between said bundle face and said target without moving said bundle face and imaging lens, and for generating an AC component in said sensor signal, said AC component being indicative of an instantaneous distance between said face and said predetermined position; and
- wherein said leg is disposed generally perpendicularly to the target surface and the proximity sensor comprises two mirrors disposed in said light path, and said oscillating means includes at least one oscillating motor coupled to one of said mirrors for reciprocating said one mirror.

3. The proximity sensor of claim 2 wherein said oscillating means comprises a second oscillating linear motor coupled to the other mirror for reciprocating said other mirror.

4. A proximity sensor for determining the distance to a target comprising:
- a light source;
- a bifurcated bundle of optical fibers with a first arm arranged to receive light from said light source, a second arm, and a common leg terminating in a bundle face:
- an imaging lens disposed in a light path between said bundle face and said target for generating a first image of said face on a surface of said target, and for generating a second image of the target on said face, the fibers of said bundle being arranged and constructed to conduct light received from the target through said second arm, the light received through said second arm having a minimal intensity when said face is at a predetermined position from said target;
- a light sensor coupled to said second arm for generating a sensor signal corresponding to the received light;
- a control circuit for generating a control signal corresponding to said sensor signal;
- oscillating means for oscillating a length of the light path between said bundle face and said target without moving said bundle face and imaging lens, and for generating an AC component in said sensor signal, said AC component being indicative of an instantaneous distance between said face and said predetermined position; and
- further comprising a flexible lens attached to characteristics of said flexible lens to change the length of the path.

5. The proximity sensor of claim 4 wherein said means for changing the optical characteristics comprises a collar disposed around a circumference of said flexible lens for applying an axial force to said lens and an oscillating device for oscillating said axial force.

6. The proximity sensor of claim 5 wherein said flexible lens changes its optical curvature in response to said axial force.

7. The proximity sensor of claim 5 wherein said flexible lens changes its index of refraction in response to said axial force.

8. A proximity sensor for determining the distance to a target comprising:
- a light source;
- a bifurcated bundle of optical fibers with a first arm arranged to receive light from said light source, a second arm, and a common leg terminating in a bundle face:
- an imaging lens disposed in a light path between said bundle face and said target for generating a first image of said face on a surface of said target, and for generating a second image of the target on said face, the fibers of said bundle being arranged and constructed to conduct light received from the target through said second arm, the light received through said second arm having a minimal intensity when said face is at a predetermined position from said target;
- a light sensor coupled to said second arm for generating a sensor signal corresponding to the received light;
- a control circuit for generating a control signal corresponding to said sensor signal;
- oscillating means for oscillating a length of the light path between said bundle face and said target without moving said bundle face and imaging lens, and for generating an AC component in said sensor signal, said AC component being indicative of an instantaneous distance between said face and said predetermined position; and
- wherein said imaging lens comprises two lenses spaced axially with respect to each other, and said oscillating means comprises a first motor for reciprocating one of said lenses axially to change the path length.

9. The proximity sensor of claim 8 wherein said oscillating means includes a second oscillating motor for reciprocating the other lens in phase opposition to the first lens.

10. A proximity sensor for determining the distance to a target comprising:
- a light source;
- a bifurcated bundle of optical fibers with a first arm arranged to receive light from said light source, a second arm, and a common leg terminating in a bundle face:
- an imaging lens disposed in a light path between said bundle face and said target for generating a first image of said face on a surface of said target, and for generating a second image of the target on said face, the fibers of said bundle being arranged and constructed to conduct light received from the target through said second arm, the light received through said second arm having a minimal intensity when said face is at a predetermined position from said target;

a light sensor coupled to said second arm for generating a sensor signal corresponding to the received light;

a control circuit for generating a control signal corresponding to said sensor signal;

oscillating means for oscillating a length of the light path between said bundle face and said target without moving said bundle face and imaging lens, and for generating an AC component in said sensor signal, said AC component being indicative of an instantaneous distance between said face and said predetermined position; and further comprising two prisms, disposed in the light path, and wherein said oscillating means includes means for reciprocating said prisms.

* * * * *